United States Patent
Hilgers et al.

(10) Patent No.: US 11,578,987 B2
(45) Date of Patent: Feb. 14, 2023

(54) USER TERMINAL, TRANSPORTATION VEHICLE, SERVER, AND METHOD FOR SENDING FOR A TRANSPORTATION VEHICLE

(71) Applicant: VOLKSWAGEN AKTIENGESELLSCHAFT, Wolfsburg (DE)

(72) Inventors: Marian Hilgers, Berlin (DE); Isabelle Fröhlich, Potsdam (DE); Aaron Post, Berlin (DE); Daniel Palzer, Berlin (DE); Mark Lukas, Berlin (DE)

(73) Assignee: Volkswagen Aktiengesellschaft

( * ) Notice: Subject to any disclaimer, the term of this patent is extended or adjusted under 35 U.S.C. 154(b) by 616 days.

(21) Appl. No.: 16/491,292

(22) PCT Filed: Feb. 6, 2018

(86) PCT No.: PCT/EP2018/052861
§ 371 (c)(1),
(2) Date: Sep. 5, 2019

(87) PCT Pub. No.: WO2018/162160
PCT Pub. Date: Sep. 13, 2018

(65) Prior Publication Data
US 2020/0025585 A1    Jan. 23, 2020

(30) Foreign Application Priority Data
Mar. 6, 2017 (DE) .................... 10 2017 203 611.7

(51) Int. Cl.
*G01C 21/36* (2006.01)
*H04W 4/024* (2018.01)
(Continued)

(52) U.S. Cl.
CPC ............. *G01C 21/362* (2013.01); *B60Q 1/50* (2013.01); *H04W 4/023* (2013.01); *H04W 4/024* (2018.02); *H04W 4/44* (2018.02); *H04W 88/02* (2013.01)

(58) Field of Classification Search
CPC ........ B60Q 1/50; H04W 4/023; H04W 4/024; H04W 4/44; H04W 88/02
See application file for complete search history.

(56) References Cited

U.S. PATENT DOCUMENTS 9,420,082 B2    8/2016 Park et al.
9,494,938 B1 *  11/2016 Kemler ................ G05D 1/0223
(Continued)

FOREIGN PATENT DOCUMENTS

CN    1499387 A    5/2004
CN    101677339 A    3/2010
(Continued)

OTHER PUBLICATIONS

Eckt-Dorna; Google is looking for partners for its robot car; downloaded from http://www.manager-magazin.de/unternehmen/autoindustrie/autonomes-fahren-google-sucht-partner-fuer-roboterauto-in-autobranche-a-1009947.html; Dec. 22, 2014.
(Continued)

*Primary Examiner* — Peter D Nolan
*Assistant Examiner* — Anwar Mohamed
(74) *Attorney, Agent, or Firm* — Barnes & Thornburg LLP

(57) ABSTRACT

A user terminal, a transportation vehicle, a server, a computer program product, a signal sequence and a method for sending for a first transportation vehicle. The method includes actuating an actuating device of a first user terminal; sending a wireless message from the user terminal to a server in response thereto; assigning a first transportation
(Continued)

vehicle to the user terminal; assigning a first color information to the first user terminal and the assigned first transportation vehicle; and emitting a light by the first transportation vehicle and the first user terminal, the identical color of which is defined based on the first color information.

11 Claims, 2 Drawing Sheets

(51) Int. Cl.
*H04W 4/44* (2018.01)
*B60Q 1/50* (2006.01)
*H04W 88/02* (2009.01)
*H04W 4/02* (2018.01)

(56) References Cited

U.S. PATENT DOCUMENTS

| | | | |
|---|---|---|---|
| 10,665,140 B1* | 5/2020 | Ahn | B60Q 1/04 |
| 10,821,887 B1* | 11/2020 | Kemler | G06Q 10/02 |
| 2004/0093280 A1* | 5/2004 | Yamaguchi | G07B 13/04 |
| | | | 705/26.1 |
| 2010/0069048 A1 | 3/2010 | Choi et al. | |
| 2014/0081801 A1 | 3/2014 | Lee et al. | |
| 2014/0300449 A1* | 10/2014 | Kounavis | G08B 7/06 |
| | | | 340/6.1 |
| 2015/0371537 A1* | 12/2015 | Eilertsen | G08G 1/0141 |
| | | | 701/117 |
| 2016/0042303 A1 | 2/2016 | Medina et al. | |
| 2017/0090480 A1 | 3/2017 | Ho et al. | |
| 2017/0120803 A1* | 5/2017 | Kentley | B60W 10/30 |
| 2017/0178269 A1* | 6/2017 | McKinnon | G06Q 50/30 |
| 2018/0154822 A1* | 6/2018 | Salter | B60Q 1/52 |
| 2021/0166317 A1* | 6/2021 | Simpson | G06Q 50/30 |
| 2021/0182752 A1* | 6/2021 | Fu | G06N 20/00 |
| 2021/0201265 A1* | 7/2021 | Galliano, III | G06Q 10/0832 |
| 2021/0223051 A1* | 7/2021 | Hochberg | G06Q 10/0631 |
| 2021/0248633 A1* | 8/2021 | Simpson | G06Q 40/04 |
| 2021/0286651 A1* | 9/2021 | Ho | G06F 3/0608 |
| 2021/0295686 A1* | 9/2021 | Cross | G08G 1/005 |
| 2022/0027843 A1* | 1/2022 | Li | G06V 40/28 |

FOREIGN PATENT DOCUMENTS

| | | |
|---|---|---|
| CN | 102186142 A | 9/2011 |
| CN | 104641392 A | 5/2015 |
| CN | 104869223 A | 8/2015 |
| DE | 202016004260 U1 | 8/2016 |
| DE | 102015209190 A1 | 11/2016 |
| EP | 3171246 A1 | 5/2017 |
| JP | 2004157698 A | 6/2004 |

OTHER PUBLICATIONS

Park et al.; A Beacon Color Code Scheduling for the Localization of Multiple Robots; IEEE Transactions on Industrial Informatics; Aug. 1, 2011; vol. 7, No. 3; pp. 467-475.

Search Report for International Patent Application No. PCT/EP2018/052861; dated Mar. 28, 2018.

Office Action; Chinese Patent Application No. 201880016102.9; Oct. 10, 2022.

* cited by examiner

USER TERMINAL, TRANSPORTATION VEHICLE, SERVER, AND METHOD FOR SENDING FOR A TRANSPORTATION VEHICLE

PRIORITY CLAIM

This patent application is a U.S. National Phase of International Patent Application No. PCT/EP2018/052861, filed 6 Feb. 2018, which claims priority to German Patent Application No. 10 2017 203 611.7, filed 6 Mar. 2017, the disclosures of which are incorporated herein by reference in their entireties.

SUMMARY

Illustrative embodiments relate to a user terminal, to a transportation vehicle, to a server, to a computer program product, to a signal sequence and to a method for sending for a transportation vehicle. In particular, the illustrative embodiments relate to simple hardware for ordering transportation vehicles, which hardware can also be used by technically inexperienced persons and by persons with cognitive and sensory limitations who would like to participate in the road traffic.

BRIEF DESCRIPTION OF THE DRAWINGS

Disclosed embodiments are described in more detail below with reference to the drawings, in which.

DETAILED DESCRIPTION

Figure 1:
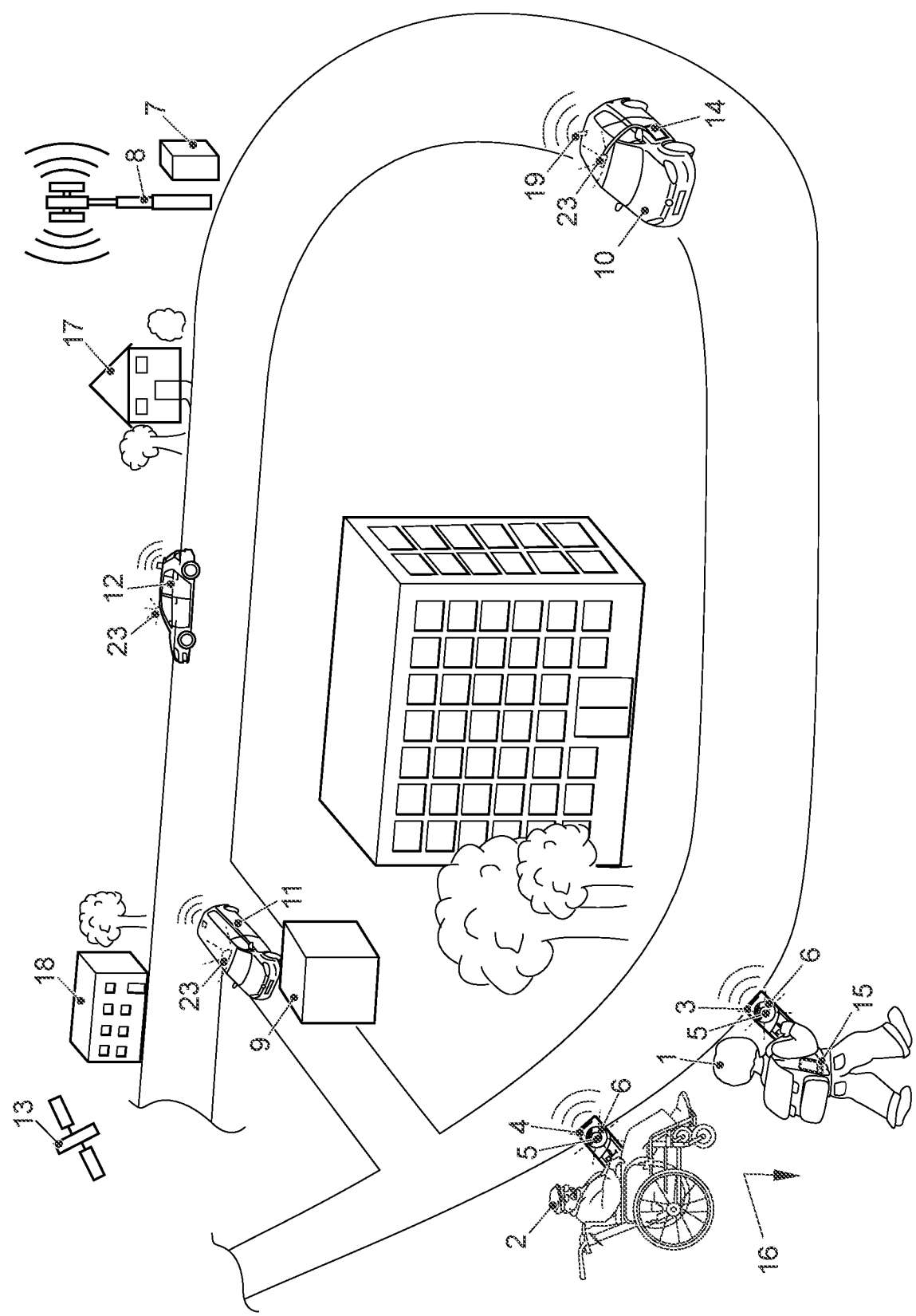
FIG. 1 shows a schematic illustration of a scenario in which use is made of two exemplary embodiments of a disclosed user terminal for sending for two exemplary embodiments of disclosed transportation vehicles using an exemplary embodiment of a disclosed server in an exemplary embodiment of a disclosed method.

As a result of an ever increasing traffic density, concepts whose aim is shared use of transportation vehicle by a multiplicity of users have been given a boost. Rental cars, taxi drivers, car-sharing pools and neighborhood transportation vehicles increase the average period of use of the respective transportation vehicle and therefore reduce the traffic density, thus saving energy resources and the environment. Many of the above-mentioned concepts use conventional smartphones on which appropriate applications ("apps") should be installed to search for, reserve and order the transportation vehicles, perform billing-related operations, assess the transportation vehicle and look for parking spaces at which the transportation vehicles can be received and subsequently delivered again.

For a multiplicity of potential users, smartphones are not suitable end-user hardware. This is due, on the one hand, to the sometimes costly purchase and the costly operation (data tariffs) of the smartphones. On the other hand, information displayed on the small displays cannot be seen or can be seen only with difficulty by visually impaired and elderly persons, for example. In addition, the representation of information by numbers and letters requires an appropriate educational background which is sometimes not available for fellow citizens from abroad, for educationally deprived classes and for children of preschool and primary school age. As a result, the traffic density is not reduced in the best possible manner according to the prior art.

DE 20 2016 004 260 U1 discloses a system for coordinating a plurality of transportation vehicles used for patient transport. To increase the user comfort, transport parameters are already transmitted in digital form when ordering and transportation vehicle parameter sets for ensuring that the purpose of the journey is complied with are compared therewith.

DE 10 2015 209 190 A1 discloses a method for the user-defined provision of a transportation vehicle, in which a trajectory autonomously traveled by a transportation vehicle within a parking facility (for example, parking garage) is visualized on a smartphone display belonging to a user.

Content available at www.manager-magazin.de discloses the idea of making it possible for users to order a transportation vehicle using a smartphone app to be able to use the transportation vehicle like a taxi.

Disclosed embodiments mitigate or eliminate the above-mentioned drawbacks of the prior art.

This is achieved by a method for sending for a transportation vehicle. The transportation vehicle, which may be an automobile, a van, a truck, a motorcycle, an aircraft and/or a watercraft, is also referred to below as the "first transportation vehicle". To send for the transportation vehicle, a user actuates an actuating device, for example, disclosed hardware, which is also referred to below as the "first user terminal". Although the user terminal may be a conventional smartphone, a configuration which is less complex and more robust in terms of hardware and software is an option. It is possible to completely dispense with a screen since the disclosed embodiments make it possible to reduce the optical communication between the user and the user terminal on the basis of individual light signals. As a result of the actuation of the actuating device, which may be a software or hardware button, a wireless message is emitted by the user terminal. This wireless message can be directly transmitted to the transportation vehicle to be sent for, for example. This does not exclude the interposition of terrestrial mobile communication, a Wi-Fi hotspot or the like. In addition, it is also possible to interpose a server which can moderate the communication between the user terminal or many user terminals and the respective transportation vehicle or a multiplicity of transportation vehicle. In addition, the transportation vehicle sent for is assigned to the user terminal. In other words, the first transportation vehicle is reserved for the user of the user terminal. The first transportation vehicle is logically linked to the first user terminal. This link is tied to a single purpose of the journey (collecting the user at the current position of the latter and bringing the user to the destination position of the latter) and can be eliminated, in particular after the driving job has been carried out. To make it possible for the user to identify the approaching first transportation vehicle as early as possible and without barriers, an item of first color information is assigned to the first user terminal and to the first transportation vehicle assigned to the latter. For example, a wireless message containing the first color information can be transmitted to the first transportation vehicle. Accordingly, a wireless message containing the first color information can be transmitted to the first user terminal. Through the emission of light of a color corresponding to the color information, the user can determine, on the basis of a user terminal, which approaching transportation vehicle is assigned to the user or the user terminal thereof. For this purpose, the user can first of all catch sight of the light emitted by the user terminal and can then search the environment for the transportation vehicle emitting light of the same color. The user can hold the user terminal in the direction of the approaching transportation vehicle to be able to compare the color shades with one another particularly well. Letters need not be deciphered nor understood to identify the transportation vehicle, for example, on the basis of a number plate. In darkness, the light emitted by the transportation vehicle can be easily detected from a distance, with the result that the user can change the side of the road, if necessary, to get into the transportation vehicle as early as possible. If "light of a predefined color" is referred to within the scope of the present disclosure, this should also be understood as meaning a predefined temporal color profile, a predefined temporal intensity profile and/or a predefined spatial light distribution pattern which can be accordingly reproduced both by the user terminal belonging to the user and by the transportation vehicle. As a result, young children, pensioners and other persons can access transportation vehicle without having to carry a smartphone or having to decipher/understand information displayed on a display of a smartphone.

The transportation vehicle can first of all be chosen from a multiplicity of transportation vehicle which have been logically linked to the user terminal and/or to a server in advance. The server can be the server belonging to a service provider/taxi company, etc. Accordingly, the user terminal can also be linked to the server, with the result that an identity of the owner of the user terminal, as well as payment arrangements and contact data, for example, are stored on the server without them necessarily having to have been stored by the user terminal. Rather, the information which is linked to the user terminal and is needed to collect and transport the user may have been defined at an earlier time by a smartphone, a tablet, a PC or the like.

The transportation vehicle may have been conventionally selected from a multiplicity of transportation vehicle on the basis of the position to enable the shortest possible approach to the user and therefore the shortest possible waiting time of the user. This increases the user's comfort and reduces the emissions arising for the approach to the user.

If the method described above is intended to support a multiplicity of different user positions, the determination of a position of the first user terminal can first of all be arranged. This can be carried out, for example, by evaluating Wi-Fi hotspots, terrestrial mobile radio signals and/or signals emitted in a satellite-based manner. If the user carries a smartphone, the position can be determined by the smartphone, for example, and the coordinates of the user can be transmitted to the transportation vehicle, the server or initially the first user terminal using a short-range radio connection (BLUETOOTH®, BLUETOOTH® LE). In other words, the determined position (actual position) of the user terminal is emitted as a wireless message and is used by the first transportation vehicle as the starting location of the route to be traveled with the user. This does not exclude the user terminal being able to contain a data memory which defines a multiplicity of predefined starting positions. By actuation patterns assigned to the different starting positions, the user can use the actuating device to transmit a respective starting location to the transportation vehicle. For example, a simple push of a button can indicate the collection at the home address, whereas a double-click causes collection at the kindergarten. A long press in turn can cause collection at the retirement home or at another facility. This makes it possible to select different ways for defining a starting position for the route to be traveled.

To keep the user terminal as simple as possible in terms of hardware and to exclude operating errors, provision may be made for destinations to be able to be written to a memory of the user terminal by a smartphone, a PC or a tablet. Wireless information interchange or an electrical connection to the user terminal can be established for this purpose, for example. One possibility for an electrical connection is a USB or FireWire connection which can be connected to a PC. A period (for example, a time of day based on a day of the week), within which the user terminal is predefined for approaching a particular destination, can also be stipulated in one of the above-mentioned ways. If it is subsequently automatically determined that the user terminal is in the first transportation vehicle which has been sent for, the predefined destination is automatically approached without a destination position having to be predefined to the first transportation vehicle by the user. Rather, the first transportation vehicle reads where the journey is intended to go from a memory of the user terminal or from an Internet-based/server-based profile. This has the benefit that the user (in particular, a child/a pensioner/a passenger who is mentally sound only to a limited extent) cannot approach a destination other than that defined by a responsible person (for example, parent, legal guardian). For example, the user terminal can be handed over to the user or fastened to the latter without the definition of a destination. The legal guardian can predefine the destination position to be currently approached on the server/in a cloud using a smartphone, a PC or the like, in which case the legal guardian links an identifier/a profile of the user terminal to the new destination. As soon as the first transportation vehicle reads the identifier from the user terminal, the transportation vehicle can ask the server/the cloud whether an updated destination position has been predefined for the user terminal or whether a destination generally predefined on the basis of a current time of day/a current date should be approached. In a corresponding manner, it is also possible to predefine times of the day/days of the week, etc., at which the (for example, sensorially or cognitively impaired) user is authorized to define his own destination positions or to negotiate them with the driver of the transportation vehicle.

A robust, energy-saving and visually appealing design of the user terminal makes it possible to use a multiplicity of LEDs as luminous means which are controlled to emit the light. The LEDs may be arranged, in particular, in a linear manner, in a circular manner, in a manner following an oval shape or the like. In particular, the LEDs may surround, optionally enclose, the actuating device. In this manner, a user can find and use the actuating device without any problems even in poor visibility. The multiplicity of LEDs may have, for example, an optical diffuser which hampers or entirely avoids recognizability of the individual luminous means/LED.

Furthermore, ramped control of the LEDs can ensure that smooth transitions between illuminated and non-illuminated regions of the light are produced. A linear or chain-like arrangement of the LEDs also makes it possible to display an (expiring) period, thus illustrating an expected waiting time for the first transportation vehicle. For this purpose, the multiplicity of LEDs can first of all be caused to become completely luminous and can be continuously reduced to zero on the basis of the elapsed time to the time of the expected arrival of the first transportation vehicle. In this manner, the waiting time can also be displayed by very simple hardware and virtually without software and can therefore be set up in an extremely robust manner.

To avoid unnecessarily reducing the energy resources of the user terminal, light can be emitted by the first user terminal only in response to a predefined spatial relationship with respect to the transportation vehicle being achieved. In other words, it is possible to wait for a time after which a line of sight exists between the user and the approaching transportation vehicle at the earliest possible time. This can be effected, for example, by continuously locating the position of the transportation vehicle and comparing it with the position of the user terminal. Alternatively, an expected arrival time of the transportation vehicle, which is determined early, can be predicted and the user terminal can be prompted to release the light only shortly before the expected arrival of the transportation vehicle. Accordingly, vice versa, the transportation vehicle can be prompted to release light only when the transportation vehicle has reached the position of the user (for example, up to a predefined distance). This makes it possible to avoid irritation of other road users or of other waiting potential users.

The disclosed method is possible for distinguishing those transportation vehicles and user terminals which are used in the spatial vicinity of one another. One example shows a possible configuration of the disclosed method as follows: a first user terminal is first of all used, as described above, to send for a first transportation vehicle. A second user terminal is additionally used to send for a second transportation vehicle. The second user terminal can also transmit a wireless message directly to a second transportation vehicle and/or to a predefined server (for example, the server described above), in response to which the second transportation vehicle is assigned to the second user terminal. To make the transportation vehicle distinguishable for the waiting users, an item of second color information, which differs from the first color information, is also assigned to the second transportation vehicle and to the second user terminal. As described above, the second transportation vehicle is now also prompted to emit light which is defined by the second color information. The second user terminal is also prompted to emit light, the color of which is defined by the second color information and is substantially identical to the light color emitted by the second transportation vehicle. Depending on the number of potential users, the use of the available color space will possibly make it more difficult to distinguish the colors of the first color information and the second color information. Therefore, a respective item of position information relating to the first user terminal and relating to the second user terminal can be optionally compared with one another. If the positions of the two user terminals differ sufficiently from one another (the users are positioned in different streets or even in different neighborhoods, for example), there can be no fear of confusing the respectively approaching transportation vehicle even if identical colors are used. However, in response to a predefined spatial relationship (proximity) between the two user terminals, the second color information can be selected in such a manner that a predefined minimum color distance from the first color information is complied with. For example, different basic colors can be defined by the first and second color information, as a result of which there is no risk of confusion if the first user and the second user are waiting for their respective transportation vehicle beside one another (for example, at the exit of a fair, a kindergarten or the like). The avoided risk of confusion can repeatedly result in an improvement in the service. On the one hand, it can be ensured that a first transportation vehicle sent for by a first user at a first time is not erroneously entered by a second user who ordered his second transportation vehicle only at a later, second time. On the other hand, any predefined desired configuration of the transportation vehicle can be better matched to the requirement of the respectively waiting user. If, for example, a kindergarten child requires a booster seat or a child's seat which is not carried by another transportation vehicle, confusion of the approaching transportation vehicles by the users can spoil the purpose of the journey. As a result of a sufficient color distance (at least assuming a spatial proximity of the first and second users), the service of the transportation vehicle or the operator thereof can be made fairer and more comfortable.

A second disclosed embodiment proposes a user terminal which can be used in a method described above. The user terminal may be a smartphone, a handheld transmitter or the like. A robust, low-volume and cost-effective hardware configuration should be selected, which configuration has an actuating device, a position determination device, a transceiver and an evaluation unit (for example, a microcontroller, a programmable processor or the like). Luminous means which can release light of a predefinable color are additionally provided. The evaluation unit is set up, in conjunction with the actuating device (for example, a pushbutton), to receive a user input. The user of the disclosed user terminal uses the user input to express the desire to send for a transportation vehicle from a predefined pool of transportation vehicle. The transceiver (for example, comprising an antenna) is set up, in response to the user input, in conjunction with the position determination device, to emit a wireless message for sending for a first transportation vehicle. The wireless message can be transmitted, for example, to a server which conveys it between the user terminal and the transportation vehicle. The transceiver is also set up to receive a confirmation of an assignment of the first transportation vehicle to the first user terminal and an item of first color information. This acknowledges that the first transportation vehicle follows the call from the first user terminal and does not serve any other passengers. Depending on the received color information, the luminous means may also be set up to emit light, the color of which is defined by the color information. In summary, the user terminal is set up, in response to the transmission of a wireless message to a transport service, to be assigned an item of color information by the transport service and to emit corresponding light. If the same color information is communicated to the assigned transportation vehicle, the disclosed user terminal, in conjunction with the transportation vehicle, can implement the same features, combinations of features and benefits as those stated in connection with the above-mentioned method.

A third disclosed embodiment proposes a transportation vehicle comprising a transceiver (in particular, comprising an antenna), an evaluation unit (for example, an electronic control device, a programmable processor, a microcontroller or the like) and a luminous means (for example, an exterior light, a rotating light or the like). The transportation vehicle may be an automobile, a van, a truck, a motorcycle, an aircraft and/or a watercraft. Depending on the intended application, the transportation vehicle may have approval for road use, without this being required for the present disclosure. The evaluation unit is set up, in conjunction with the transceiver, to receive a wireless message which is used to assign the first transportation vehicle to the user terminal which generated the wireless message. The wireless message can be (as stated in connection with the above disclosed embodiments) conveyed via a server which coordinates the transportation vehicle in a transportation vehicle pool addressed by the user terminal. The wireless message defines, for the transportation vehicle, an assignment to the first user terminal (which sends for the transportation vehicle), a current position of the first user terminal as the first destination for the transportation vehicle and an item of first color information. The color information defines a light color for both parties in the assignment, with the result that the luminous method or mechanism of the transportation vehicle is set up, on the basis of the color information, to emit light into the environment of the transportation vehicle, the color of which light is defined by the first color information. The light to be emitted into the environment of the transportation vehicle can be switched on, depending on the position of the transportation vehicle and the position of the user terminal, as the transportation vehicle approaches the user, can be recognized by the user and can be interpreted as a confirmation of the fact that the first transportation vehicle is the transportation vehicle ordered/sent for by the user. The features, combinations of features and benefits corresponding to the above disclosed embodiments also emerge with respect to the transportation vehicle.

A fourth disclosed embodiment proposes a server for sending for a first transportation vehicle by a user terminal. The server may be a stationary server which coordinates at least the transportation vehicle belonging to a predefined operator/transportation vehicle pool with respect to the users/user terminals registered with the operator/pool. The server is operatively connected to a transceiver, via which the server can communicate with the transportation vehicle, on the one hand, and with the user terminals, on the other hand. An evaluation unit (for example, a programmable processor, controller or the like) is set up, in conjunction with the transceiver, to receive a wireless message for sending for a first transportation vehicle by a user terminal. The evaluation unit is also set up to identify the user terminal and to optionally assign it to a user/an account. The evaluation device may also identify the first transportation vehicle as being suitable for transporting the user terminal and, in response to this, can assign the first transportation vehicle to the user terminal. In other words, it is determined, for example, that the first transportation vehicle is in the vicinity of the user terminal sending for the transportation vehicle. Alternatively or additionally, a transportation vehicle configuration predefined/requested for the purpose of a journey of the user of the user terminal can be automatically confirmed before the first transportation vehicle is assigned to the user terminal. The evaluation device is also set up to transmit a confirmation of the assignment and an item of first color information to the first transportation vehicle and to the user terminal. The first color information instructs both the transportation vehicle and the user terminal to emit light of an identical color into their respective environment at a given time. The features, combinations of features and benefits of the disclosed server clearly emerge in a corresponding manner from the above statements, such that reference is made to the above disclosed embodiments to avoid repetitions.

A fifth disclosed embodiment proposes a computer program product having instructions which, when executed on an evaluation unit of a user terminal according to the second-mentioned embodiment or of a transportation vehicle according to the third-mentioned embodiment, cause the evaluation unit to carry out the method according to the first-mentioned embodiment. The computer program product may be a CD, a DVD, a flash memory, a ROM/RAM a Blu-ray disc, etc.

A sixth disclosed embodiment proposes a signal sequence representing instructions which, when executed on an evaluation unit of a user terminal according to the second-mentioned embodiment or of a transportation vehicle according to the third-mentioned embodiment, cause the evaluation unit to carry out the method according to the first-mentioned embodiment. In this manner, the provision of the instructions representing the disclosed method is also protected if the data memories needed to permanently store the instructions are arranged outside the scope of the attached claims.

FIG. 1 shows a schoolchild 1, as a first user wishing to use an autonomously drivable transportation vehicle 10 to approach his dwelling 17 as the destination, and a pensioner 2, as a second user wishing to send for a manned patient transport ambulance 11, which is suitable for a wheelchair, to approach a retirement home 18 as the destination, at a position 16. The schoolchild 1 has coupled a smartphone 15 to a user terminal 3 configured by BLUETOOTH®, wherein the smartphone 15 is able to determine the current position of the schoolchild 1 with the aid of a satellite 13. The user terminal 3 is also informed of the current position of the schoolchild 1 via the coupling. To send for the autonomously driving transportation vehicle 10, the schoolchild 1 pushes a button 5 as an actuating device of the user terminal 3, in response to which the user terminal transmits a wireless message, via a transmission mast 8, to a server 7 which is provided by the operator of the transportation vehicle 10, 11, 12. The server 7 determines that the transportation vehicle 10 is closest to the schoolchild 1 and is suitable for performing the driving task. A short time afterward, the server 7 receives the request to send a patient transport ambulance 11 from the user terminal 4 belonging to the pensioner 2, wherein the user terminal 4 independently determines the current position of the pensioner 2 (using a position determination device which is not illustrated) using the satellite 13 and has included a corresponding item of information in the wireless message for the server 7. The server 7 determines the predefined spatial proximity between the schoolchild 1 and the pensioner 2, concludes from this that there is a risk of confusion if the approaching transportation vehicles 10, 11 receive similar color information and searches for an item of color information for the patient transport ambulance 11, which color information differs sufficiently from that color information which was transmitted to the automatically drivable transportation vehicle 10. The automatically drivable transportation vehicle 10 accordingly receives, via an antenna 19 as a transceiver, the driving job and the color information, in response to which an electronic control device 14 as an evaluation unit causes a rotating light 23 as the luminous means to use the rotating light 23 on the basis of the color information to emit colored light into the environment of the transportation vehicle 10 when the schoolchild 1 is approached to within 100 m. The user terminal 3 receives an expected arrival time of the transportation vehicle 10 at the position 16 and the identical color information, in response to which a luminous means 6 surrounding the pushbutton 5 emits light in a color corresponding to the color information. The user terminal 4 then also receives an expected arrival time of the patient transport ambulance 11 and the color information sent to the patient transport ambulance 11. In response to this, it is determined that the patient transport ambulance 11 has approached the position 16 of the pensioner 2 to within approximately 100 m and, after passing a building 9, there is an optical axis to the pensioner 2, in response to which the rotating light 23 emits light with a color defined by the received color information. A corresponding situation applies to the luminous means 6 of the user terminal 4, as a result of which the pensioner 2 can identify the approaching patient transport ambulance 11 as intended for him and can distinguish it from the automatically drivable transportation vehicle 10 which is likewise approaching. The luminous ring 6 of the user terminal 4 also shows the decreasing period before the expected arrival time by a decreasing number of controlled LEDs.

Figure 2:
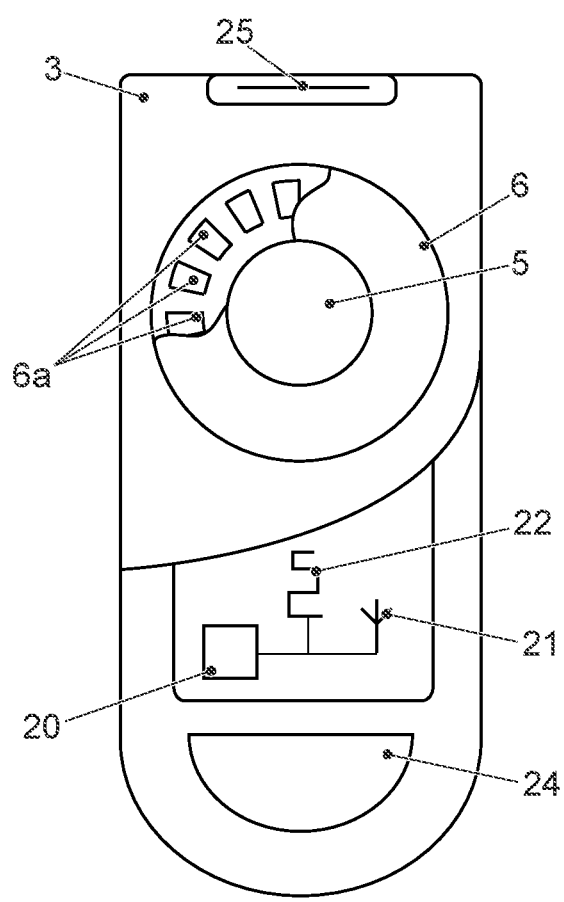
FIG. 2 shows a partially cut-away illustration of an exemplary embodiment of a disclosed user terminal.

FIG. 2 shows a partially cut-away view of an exemplary embodiment of a user terminal 3. An eyelet 24 makes it possible to fasten the user terminal 3 in a simple and secure manner to the key ring, to a belt loop or the like of the respective user to ensure that the user cannot lose the user terminal 3. A pushbutton 5 as an actuating device is surrounded by a luminous ring 6, the diffuser of which is partially cut away to show linearly arranged LEDs 6a as a circular ring behind the diffuser. The LEDs 6a are controlled by a programmable processor 20 as an evaluation unit as soon as a transportation vehicle has been assigned to the user terminal 3. The programmable processor 20 can determine corresponding information via an antenna 22 for terrestrial mobile communication or for receiving Wi-Fi signals. A GPS antenna 21 is provided as a position determination device and is likewise connected to the programmable processor 20 using information technology. On account of the simple hardware which dispenses with a conventional display, an energy store (not illustrated) of the user terminal 3 may be small and may be charged quickly (for example, inductively). The user terminal can be programmed via a USB socket 25, as a result of which an authorized user can predefine collection locations and destinations (in particular, on the basis of day-of-the-week and/or time-of-day windows) for the user terminal 3. It goes without saying that corresponding programming can also be carried out via the antenna 22.

Figure 3:
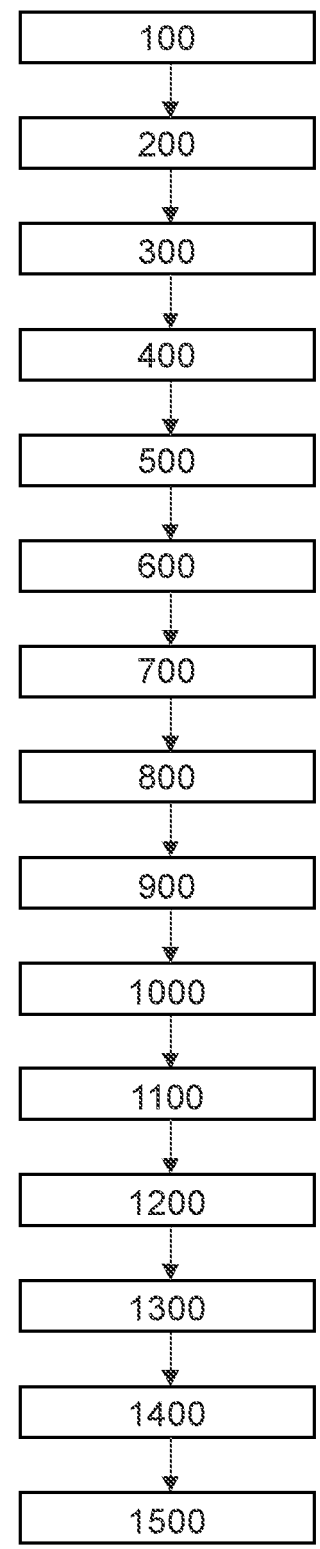
FIG. 3 shows a flowchart illustrating an exemplary embodiment of a disclosed method.

FIG. 3 shows an exemplary embodiment of a disclosed method for sending for a first transportation vehicle. In operation at 100, a destination is associated with the user terminal in a predefined period. For this purpose, the user terminal is programmed by an authorized user/administrator of the user terminal by a smartphone application. In operation at 200, an actuating device of the user terminal is actuated, as a result of which the user expresses his desire to be collected by a first transportation vehicle. In response to this, the determination of a position of the first user terminal is initiated in operation at 300. This can be carried out, for example, using radio signals which are generated in a terrestrial or satellite-based manner. The determined first position is coded in a wireless message for defining a starting location (collection location) for a journey with the first transportation vehicle in operation at 400. In operation at 500, the wireless message is transmitted from the user terminal to a server belonging to an operator of the transportation vehicle. The server assigns a first transportation vehicle to the user terminal in operation at 600 and therefore initiates the journey of the first transportation vehicle in the direction of the user. In operation at 700, an item of first color information is assigned both to the user terminal and to the first transportation vehicle. In operation at 800, light is emitted by the first transportation vehicle into its environment to signal to the user that it is intended for the purpose of the user's journey. In addition, in operation at 800, light is emitted by the first user terminal to provide the user with an indication of what type of light signals the transportation vehicle intended for the user is emitting. The user can therefore recognize, by comparing the light emitted by his user terminal with the light emitted by the first transportation vehicle, that the first transportation vehicle was sent for by the user himself. In operation at 900, the destination defined in operation at 100 is automatically approached as soon as it is determined that the user terminal is in the first transportation vehicle. This can be carried out, for example, by short-range radio interchange between the user terminal and the transportation vehicle. In operation at 1000, a wireless message from a second user terminal is received by the same server. In response to this, a second transportation vehicle is also assigned to the second user terminal in operation at 1100. When comparing respective position information relating to the first user terminal and the second user terminal in operation at 1200, the server determines that there is a predefined spatial relationship between the two user terminals. In operation at 1300, an item of second color information is therefore selected, from which the server has determined with certainty that the color information has a predefined difference from the first color information. A corresponding selection of the color information can be carried out, for example, on the basis of a set of tables. In operation at 1400, an item of second color information which differs from the first color information is assigned to the second user terminal and to the assigned second transportation vehicle. In other words, a wireless message containing an indication of the second color information is transmitted to the second transportation vehicle and to the second user terminal. In operation at 1500, light is finally emitted into the respective environment by the first transportation vehicle and by the second user terminal, in which case the type and/or color of the light is/are defined on the basis of the second color information and the type and/or color has/have a sufficient difference to the type and/or color of that light which is emitted by the first transportation vehicle and the first user terminal.

LIST OF REFERENCE SIGNS

1 Schoolchild
2 Pensioner
3, 4 User terminal
5 Pushbutton
6 Luminous ring
6a LEDs
7 Server
8 Transmission mast
9 Building
10 Automatically drivable transportation vehicle
11 Patient transport ambulance
12 Transportation vehicle
13 Satellite
14 Electronic control device
15 Smartphone
16 Current position of schoolchild/pensioner
17 Dwelling
18 Retirement home
19 GPS antenna
20 Programmable processor
21 GPS antenna
22 Antenna
23 Rotating light
24 Eyelet
25 USB socket
100-1500 Method operations

The invention claimed is:

1. A method for fulfilling a request for transportation, the method comprising:

receiving a user input from an actuating device of a first user terminal indicating a request for transportation;
in response to the receipt of the user input, transmitting a wireless message from the first user terminal to a server;
assigning, by the server, the first transportation vehicle to fulfill the transportation request from the first user terminal in response to receiving the wireless message;
assigning, by the server, first color information to the first user terminal and to the assigned first transportation vehicle; and
transmitting the first color information to the first user terminal and the assigned first transportation vehicle to cause emitting light by the first transportation vehicle and the first user terminal, the emitted light being of an identical color and defined based on the first color information,
wherein the emitted light is emitted via a plurality of light emitting sources provided on the first user terminal surrounding the actuating device, and
wherein light emission via the plurality of light emitting sources indicates a period of time until arrival of the assigned first transportation vehicle.

2. The method of claim 1, wherein the first transportation vehicle is chosen from a multiplicity of transportation vehicles which are logically linked to a server in advance.

3. The method of claim 1, wherein the actuating device is an order button configured in hardware.

4. The method of claim 1, further comprising:
arranging determination of a position of the first user terminal; and
coding the determined first position in the wireless message transmitted to the server to define a starting location for a journey with the first transportation vehicle.

5. The method of claim 1, further comprising:
associating a destination with the first user terminal; and
automatically approaching the destination as soon as it is determined that the first user terminal is located in the first transportation vehicle.

6. The method of claim 1, wherein the light emitted by the first user terminal is generated by a multiplicity of LEDs which have a linear and/or a non-rectilinear arrangement.

7. The method of claim 1, wherein light is emitted by the first user terminal only in response to a predefined spatial relationship with respect to the transportation vehicle being achieved, or vice versa.

8. The method of claim 1, further comprising:
receiving, by the server, a wireless message from a second user terminal indicating a request for transportation;
in response to receipt of the wireless message from the second user terminal, assigning, by the server, a second transportation vehicle to fulfill the request from the second user terminal;
assigning, by the server, second color information, which differs from the first color information, to the second user terminal and to the assigned second transportation vehicle; and
transmitting the second color information to the second user terminal and the assigned first transportation vehicle to cause emitting light by the second transportation vehicle and the second user terminal, the emitted light being of an identical color and defined based on the second color information.

9. The method of claim 8, further comprising:
comparing respective position information relating to the first user terminal and the second user terminal; and
in response to a spatial relationship between the first and second user terminals, selecting the second color information which has a predefined difference from the first color information.

10. A user terminal comprising:
an actuating device;
a transceiver;
an evaluation unit; and
an illumination source,
wherein the evaluation unit is configured, in conjunction with the actuating device, to receive a user input indicating a request for transportation,
wherein the transceiver is configured to:
in response to receiving user input, transmit a wireless message to a server to request sending for a first transportation vehicle,
receive a confirmation of an assignment of the first transportation vehicle to the first user terminal and first color information, and
wherein, based on the received color information, the illumination source emits light, the color of which being defined based on the first color information,
wherein the illumination source comprises a plurality of light emitting sources provided on the first user terminal surrounding the actuating device, and
wherein light emission via the plurality of light emitting sources indicates a period of time until arrival of the assigned first transportation vehicle.

11. A non-transitory computer program product comprising instructions which, when executed on an evaluation unit of a first user terminal cause the evaluation unit to carry out a method for fulfilling a request for transportation, the method comprising:
receiving a user input from an actuating device of first user terminal indicating a request for transportation;
in response to the receipt of the user input, transmitting a wireless message from the first user terminal to a server for assignment of the first transportation vehicle to fulfill the transportation request from the first user terminal in response to receiving the wireless message;
receiving, from the server, first color information assigned to the first user terminal and to the assigned first transportation vehicle; and
causing emission of light by the first user terminal, the emitted light being of an identical color to light emitted by the first transportation vehicle and being and defined based on the first color information,
wherein the emitted light is emitted via a plurality of light emitting sources provided on the first user terminal surrounding the actuating device, and
wherein light emission via the plurality of light emitting sources indicates a period of time until arrival of the assigned first transportation vehicle.

* * * * *